US006957249B2

(12) United States Patent
Salo et al.

(10) Patent No.: US 6,957,249 B2
(45) Date of Patent: Oct. 18, 2005

(54) SECURE REMOTE ACCESS TO ENTERPRISE NETWORKS EMPLOYING ENTERPRISE GATEWAY SERVERS

(75) Inventors: Randy Salo, San Diego, CA (US); Chris Van Hamersveld, San Marcos, CA (US); Barry K. Shelton, San Diego, CA (US); Larry Herbinaux, Vista, CA (US); D. Brian Deacon, Vista, CA (US); Kenneth Eugene Fayal, Jr., San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 0 days.

(21) Appl. No.: 10/600,318

(22) Filed: Jun. 19, 2003

(65) Prior Publication Data

US 2004/0010620 A1 Jan. 15, 2004

Related U.S. Application Data

(63) Continuation of application No. 09/436,661, filed on Nov. 10, 1999, now Pat. No. 6,609,148.

(51) Int. Cl.[7] .......... G06F 15/16

(52) U.S. Cl. .......... 709/217; 709/201; 709/202; 709/203; 709/218; 709/219; 707/10; 707/102

(58) Field of Search .......... 709/217–219, 709/201–203; 707/10, 102

(56) References Cited

U.S. PATENT DOCUMENTS

| | | | | | |
|---|---|---|---|---|---|
| 5,329,619 | A | * | 7/1994 | Page et al. | 709/203 |
| 5,805,803 | A | * | 9/1998 | Birrell et al. | 713/201 |
| 5,974,416 | A | * | 10/1999 | Anand et al. | 707/10 |
| 6,061,650 | A | * | 5/2000 | Malkin et al. | 704/228 |
| 6,205,482 | B1 | * | 3/2001 | Navarre et al. | 709/227 |
| 6,256,666 | B1 | * | 7/2001 | Singhal | 709/217 |
| 6,324,681 | B1 | * | 11/2001 | Sebesta et al. | 717/102 |
| 6,359,892 | B1 | * | 3/2002 | Szlam | 370/401 |
| 6,397,220 | B1 | * | 5/2002 | Deisinger et al. | 707/102 |
| 6,415,288 | B1 | * | 7/2002 | Gebauer | 707/10 |
| 6,496,850 | B1 | * | 12/2002 | Bowman-Amuah | 709/203 |
| 6,499,137 | B1 | * | 12/2002 | Hunt | 717/164 |
| 2002/0072830 | A1 | * | 6/2002 | Hunt | 701/1 |

* cited by examiner

*Primary Examiner*—Nabil El-Hady
(74) *Attorney, Agent, or Firm*—Philip R. Wadsworth; Robert J. O'Connell; John L. Ciccozzi

(57) ABSTRACT

A computer system includes an enterprise gateway server and a remote gateway server connected via a data network, such as the Internet, that is relatively inefficient compared to typical private networks. The remote gateway server interfaces the enterprise gateway server to corporate messaging and collaboration data stored locally relative to the remote gateway server. The enterprise gateway server converts multiple data requests for the messaging and collaboration data into a single higher-level data request that is transmitted across the data network. The remote gateway server receives the request and converts the single high level request back into the original multiple request format for presentation to the messaging and collaboration database.

18 Claims, 10 Drawing Sheets

SECURE REMOTE ACCESS TO ENTERPRISE NETWORKS EMPLOYING ENTERPRISE GATEWAY SERVERS

CROSS-REFERENCE TO RELATED APPLICATIONS

This application is a continuation of U.S. patent application Ser. No. 09/436,661, filed Nov. 10, 1999, now U.S. Pat. No. 6,609,148, issued Aug. 19, 2003.

FIELD OF THE INVENTION

This invention generally relates to the field of communications and information network management. More particularly, the present invention relates to a novel system that allows remote end users to rapidly and securely access information from a variety of subscriber devices using a centralized remote data center.

DESCRIPTION OF RELATED ART

Recent innovations in wireless communication and computer-related technologies as well as the unprecedented growth of Internet subscribers have provided tremendous opportunities in telecommuting and mobile computing. In fact, corporate entities and enterprises are moving towards providing their workforces with ubiquitous access to networked corporate applications and data, such as, for example, e-mail, address books, appointment calendars, scheduling information, etc.

The problem with providing universal access to proprietary information is one of logistics. For example, it is common for an individual to keep sets of addresses on different devices, such as work addresses on a personal computer used at work, personal addresses on a home computer, and commonly called telephone numbers on a cellular telephone. Problems arise when the individual is at home and wishes to call or fax a work colleague, particularly when the individual does not have access to the work addresses from the home computer or any other available device. Further, different urgent priority items, such as urgent e-mails, may be unavailable to a subscriber for an extended period of time if the subscriber is equipped only with a personal digital assistant (PDA) and a cellular telephone unable to receive e-mail.

Along with the problem of maintaining data in various locations, users frequently have access to different devices, each having different data access abilities and requirements. For example, certain cellular telephones have speed dial or commonly called telephone numbers, but do not have the ability to receive e-mail. Certain cellular telephone handsets have the ability to receive alphanumeric pages, but some cellular service providers do not support this feature while others do. Also, many PDAs do not have the ability to receive over-the-air transmissions, but can synchronize with a database, such as a database associated with a personal computer and/or network. Other PDAs have the ability to receive and edit e-mail messages. Some systems or networks allow a subscriber to download her e-mail headers to a remote device and read some portion or all of the e-mail. After reading the e-mail on the remote device, some systems delete the e-mail while others maintain the e-mail on the system until read or deleted at the home system. Hence the ability for a subscriber to access, maintain, and dynamically utilize information is heavily dependent on the input device employed by the subscriber.

Further, certain organizations limit access to workers having a need to know the information maintained. For example, many corporations control e-mail using a dedicated server having restricted access, including using firewalls and encryption. Access to this information requires making the information available under conditions imposed and maintained by the corporation.

For purposes of this application, a corporation or other entity, public private, or otherwise, is referred to as an "enterprise." As used herein, an enterprise represents any entity maintaining or controlling information at a remote location from a subscriber. Examples of enterprises include a secure corporate network, a dedicated server, or a publicly accessible web site network. Other enterprises may be employed which maintain and control certain information as may be appreciated by those of skill in the art.

While certain systems have been employed to provide access to information maintained at an enterprise, none have provided for access by multiple devices including PDAs, cellular telephones, personal computers, laptops, MICROSOFT® Windows CE devices, and so forth. Further, those systems discussed in the literature that provide information access to users employing a limited set of input devices have suffered from accessibility and data latency problems. Accessibility issues involve providing access to the information by only offering access through a corporate Intranet or other internal access scheme. A subscriber wishing to review his or her e-mail on a laptop borrowed from a colleague frequently is denied access to the corporate information. Further, data latency universally inhibits the ability to access data. Users desire a fast response to the information they desire, and information on any device that takes longer than fifteen seconds to load is undesirable.

Additionally, certain enterprises wish to have control over information maintained on their networks, including maintaining password and account information for the enterprise users. It is therefore undesirable for the enterprise to offer sensitive data, such as subscriber information and passwords, to outside parties where the data may be compromised. Security issues, such as corporate firewalls and encryption of data, must in many instances be maintained and controlled by the enterprise rather than a third party.

Certain enterprises also have particular needs and preferences. For example, some corporate enterprises may maintain a network that interfaces with offices in different countries, and depending on the person accessing the information, he or she may have a particular language preference. Certain enterprises also find it highly desirable to have a reconfigurable interface to provide updated graphics, information, and presence to network users. These subscriber interfaces may change rapidly in some industries. A system offering information access should therefore be readily reconfigurable and offer subscriber interfaces structured for the enterprise for use on a variety of input devices.

Such a system should be relatively easy to set up and maintain, and use readily available hardware and software wherever possible. Further, the system should provide for data access tracking and efficient security and authorization.

It is therefore an object of the current invention to provide a system for offering convenient and efficient access to data, including e-mail, calendar/date book, and addresses. These terms are commonly known in the art, wherein e-mail represents electronic mail deliverable in a recognized format, including attachments and other electronic mail attributes. Calendar/date book data represents dates of meetings, appointments, holidays, or other noteworthy events maintained in a searchable database type format. Addresses represent information associated with contacts, such as the contact's name, title, company, business address, business phone number, business fax number, home address and/or phone number, cellular phone number, e-mail address, and so forth. Access to the information should preferably be provided through a central location.

It is a further object of this invention to provide for access to the desired information using any of a variety of input devices, including but not limited to a personal computer, a laptop computer, a PDA, a cellular telephone, a two-way pager, and a MICROSOFT® Windows CE device.

It is still a further object of the present invention to provide a system which recognizes the type of device addressing and requesting the information and to provide the information to the device in a proper format in accordance with the preferences of the enterprise transmitting the information.

It is another object of the current invention to provide a central location for enabling a series of users to access information at various enterprises when said users employ various input devices. Such a central location should offer relatively robust access to the information desired, offer security for information maintained on the enterprise such as subscriber data and passwords, and provide for authentication and access tracking.

It is yet another object of the current invention to provide an interconnection between a central data location and an enterprise such that the interconnection can quickly, reliably, and efficiently transfer information, such as e-mail, calendar, and address data, between the central data location and the enterprise.

It is a further object of the current invention to provide a remote enterprise architecture that supports inquiries from and responses to the central data location for use in a multiple subscriber and multiple input device data access scheme. The remote enterprise architecture should permit rapid access to the information and transmission of the information while simultaneously maintaining firewall, security, and encryption requirements.

It is still a further object of the current invention to provide architectures which are reliable and easy to use from both a software and hardware standpoint, and utilize where possible existing components to minimize system costs.

It is yet a further object of the current system to provide a subscriber interface that is readily reconfigurable by an enterprise maintaining the information. Further, the subscriber interface should preferably provide enterprise data on various input devices and take into account enterprise and subscriber preferences when interfacing with a subscriber.

It is another object of the current invention to provide a business model for supplying users with access to e-mail, calendar, and address information in a multiple input device environment when the desired information is maintained at a remote enterprise.

SUMMARY OF THE INVENTION

Accordingly, there is herein provided a computer system for providing access to information maintained on an enterprise network.

One aspect of the present invention is directed to a computer system comprising a plurality of components, including a data network, an enterprise gateway server, a remote gateway server, and a messaging server. The enterprise gateway server is connected to the data network and includes software that converts a plurality of data requests for messaging and collaboration data into a single higher level request and transmits the higher level request over the data network. The remote gateway server is also connected to the data network and receives the higher-level request from the enterprise gateway server and converts the higher-level request to the plurality of data requests. The messaging server hosts messaging and collaboration data and is connected to the remote gateway server through a private data network, the private data network connecting the messaging server to the remote gateway server more efficiently than the data network that connects the enterprise gateway server to the remote gateway server, the messaging server providing messaging and collaboration data to the remote gateway server in response to receiving the plurality of data requests.

A second aspect of the present invention is directed to a computer system comprising a plurality of elements including an enterprise gateway server and a corporate network connected via the Internet. The enterprise gateway server includes software that converts a plurality of data requests for messaging and collaboration data into a single higher level request and transmits the higher level request over the data network. The corporate network receives the higher level request from the enterprise gateway server and converts the higher level request to the plurality of data requests. The corporate network uses the converted plurality of data requests to query a messaging database that stores messaging and collaboration data corresponding to the plurality of data requests from the enterprise gateway server, and returns the results of the query to the enterprise gateway server.

Other objects, features, and advantages of the present invention will become more apparent from a consideration of the following detailed description and from the accompanying drawings.

BRIEF DESCRIPTION OF THE DRAWINGS

The accompanying drawings, which are incorporated in and constitute a part of this Specification, illustrate an embodiment of the invention and, together with the description, explain the objects, advantages, and principles of the invention. In the drawings.

DETAILED DESCRIPTION OF THE PREFERRED EMBODIMENTS

The following detailed description of the embodiments of the present invention refers to the accompanying drawings that illustrate these. Other embodiments are possible and modifications may be made to the embodiments without departing from the spirit and scope of the invention. Therefore, the following detailed description is not meant to limit the invention. Rather, the scope of the invention is defined by the appended claims.

It will be apparent to one of ordinary skill in the art that an embodiment of the present invention, as described below, may be realized in a variety of implementations, including the software, firmware, and hardware of the entities illustrated in the figures (i.e., remote access device 104, BSC/MSC 106 and IWF 108). The actual software code or control hardware used to implement the present invention is not limiting of the present invention. Thus, the operation and behavior of the present invention will be described without specific reference to the actual software code or hardware components. Such non-specific references are acceptable because it is clearly understood that a person of ordinary skill in the art would be able to design software and control hardware to implement the embodiment of the present invention based on the description herein.

Figure 1:
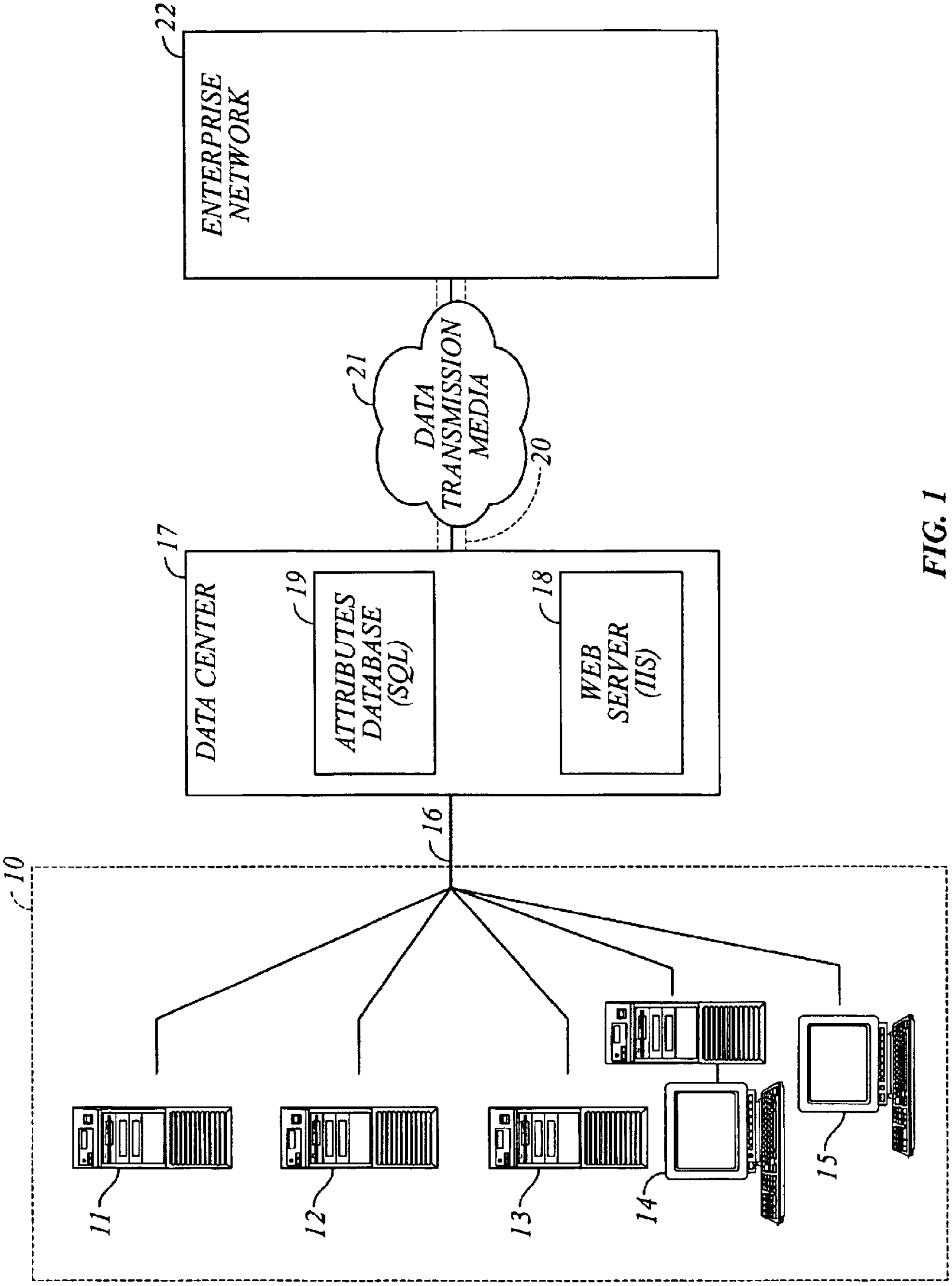
FIG. 1 is a conceptual diagram representing the major components of the system.

FIG. 1 presents a conceptual overview of the design of the current system. From FIG. 1, a subscriber has access to an input device, which may be one from a class of input devices 10 including, but not limited to, a cellular telephone 11, a personal digital assistant (PDA) 12, a MICROSOFT® Windows CE device 13, a desktop personal computer 14, or a laptop personal computer 15. Other devices may be employed, such as a two-way paging device, while still within the scope of the present invention. The important characteristic of the class of input devices 10 is that each device must have the ability to receive information.

The input device transmits or receives information over a data link 16, such as a telephone line, dedicated computer connection, satellite connection, cellular telephone network, the Internet, or other data connection. The data link 16 is connected to a data center 17, which offers a central location for accessing and processing information from various remote enterprise networks 22. Data center 17 provides users with access to information or data maintained at the enterprise networks 22. The data center 17 includes at least one web server 18 (e.g., MICROSOFT® Internet Information Server [IIS]) having access to at least one attributes database server (e.g., Structured Query Language [SQL] server) 19. The IIS server 18 identifies and authenticates the subscriber and verifies that the subscriber is associated with a particular enterprise. The IIS server 18 refers to the SQL server 19 for the data necessary to perform these tasks, and thus the SQL server 19 performs data storage for account access purposes. The IIS servers 18 process individual active server pages, or ASPs, that provide the requested information back across data link 16 to the user or subscriber. The data center 17 transmits data through a dedicated connection 20, which is preferably an IPSEC tunnel through the Internet, or a PPTP connection via the Internet. The dedicated connection 20 is provided through data transmission media 21, which may be the Internet, a Wide Area Network (WAN), or any other media used for server communication. The dedicated connection 20 provides the robustness necessary to update the subscriber and provide information in a reasonable time period. Use of a connection that is not dedicated can result in delays and service disruptions, and the Internet provides an example of a powerful and readily accessible data transmission media. Addition of enterprise networks 22 or data centers 17 to an arrangement employing the Internet is relatively simple. Note also that data link 16 may also employ the Internet for subscriber access to the data center 17.

In operation, the subscriber must first access the data center 17 using an access arrangement, such as a password verifying his or her identity. The subscriber makes a request into the subscriber device, such as a cellular telephone, to view data, such as his or her e-mail. The IIS server 18 receives the request via the data link 16 and passes the request through the dedicated connection 20 and on to the enterprise network 22. The enterprise network 22 processes the request for e-mail and obtains the necessary data pursuant to the subscriber preferences provided by the SQL server in the data center 17. For example, the subscriber is presumed to have established that if he or she desires e-mail through his or her cellular telephone, the information provided should be only the first ten messages, alphabetized by the last name of the sender. In such a situation, the enterprise network 22 obtains the requisite information and transmits the data back through the dedicated connection 20, to the data center 17, and to the subscriber via data link 16 to the requesting subscriber input device. To accomplish this, the enterprise network 22 must include a server having a scalable, reliable and secure data access platform, such as MICROSOFT® Exchange Server, for ready access to the requested e-mail, calendar, or contact information.

Figure 1A:
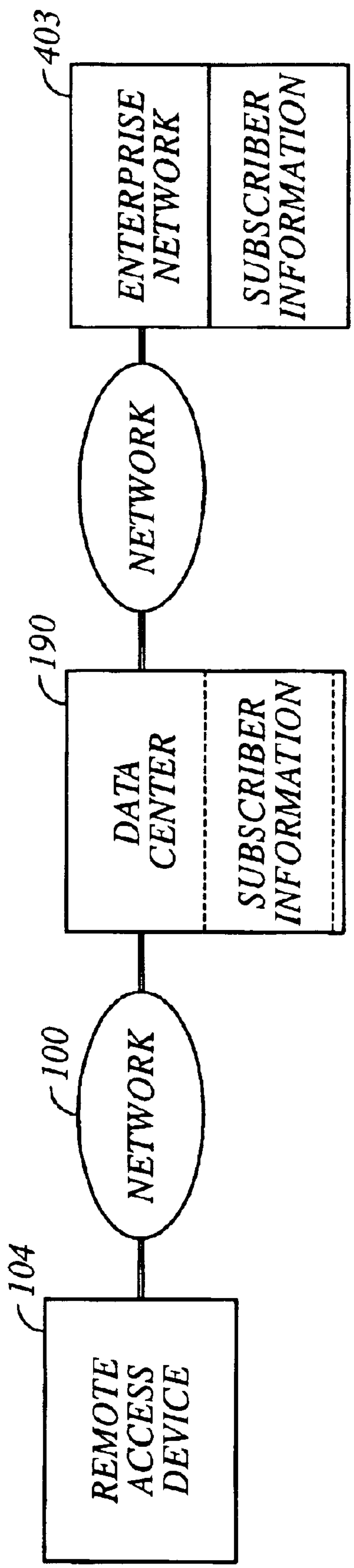
FIG. 1A is a high level block diagram depicting the basic elements of an embodiment of the present system.

FIG. 1A illustrates an embodiment of the present invention. The embodiment allows subscribers to securely and remotely access a centralized data center 190, which acts as an intermediary to facilitate subscriber information residing in an independent enterprise network 403 in real time. In one implementation, a subscriber, by virtue of a remote access device 104, makes a request, across a network 100, to a data center 190, to supply subscriber information (e.g., messaging and collaboration information, such as electronic mail, appointment calendars, address/phone books) located in an enterprise network 403. The data center 190 receives the request, authenticates the subscriber, accesses the enterprise network 403, establishes a secure session with the enterprise network 403, retrieves the subscriber information, and formats the information in accordance with the display capabilities of the remote access device 104. The remote access device 104 may be connected to a "wireline" network (e.g., personal computer, kiosk, etc.) or may be connected to a wireless network (e.g., cellular phones, personal digital assistants (PDAs), MICROSOFT® Windows CE device, etc.).

In another embodiment, as indicated by FIG. 1A, the data center 190 itself provides a central repository for the subscriber information (dashed-line). As such, the subscriber initiates a request in the remote access device 104 and the data center 190 receives the request, authenticates the subscriber, accesses the subscriber information, and formats the information in accordance with the display capabilities of the remote access device 104.

The features and details of the various embodiments of the invention will be described below.

1. Remote Access Devices

The remote access and retrieval of subscriber information resident in the enterprise network 403 is initiated by requesting the information on a remote access device 104. Generally, these requests are initiated by inputting an address on a browser (or micro-browser) interface of the remote access device 104. The address partially identifies the enterprise network 403 that the subscriber is associated with (i.e., company, employer, etc.) and the address may be in the form of an HTTP URL (Hypertext Transfer Protocol Uniform Resource Locator). The remote access devices 104 have communication capabilities, allowing them to interface with wireless and wireline communication networks. In one implementation, the remote access devices 104 are wireless and include devices that are well-known in the art, such as hand-held wireless phones, Personal Digital Assistants (PDAs), MICROSOFT® Windows CE devices, and mobile computers. Such devices operate in wireless networks that include, but are not limited to PSTN, CDPD, CDMA/IS-95, TDMA/IS-136, MOBITEX, and GSM networks.

In addition, these remote access devices 104 generally have graphical displays to accommodate their browsing capabilities. The remote access devices may use different markup languages to interpret, format, and display the contents of the retrieved subscriber information. Such languages may include Hypertext Markup Language (HTML), Handheld Markup Language (HDML), Extensible Markup Language (XML), Extensible Stylesheet Language (XSL), and Wireless Markup Language (WML).

2. Network Access to Data Center

Figure 1B:
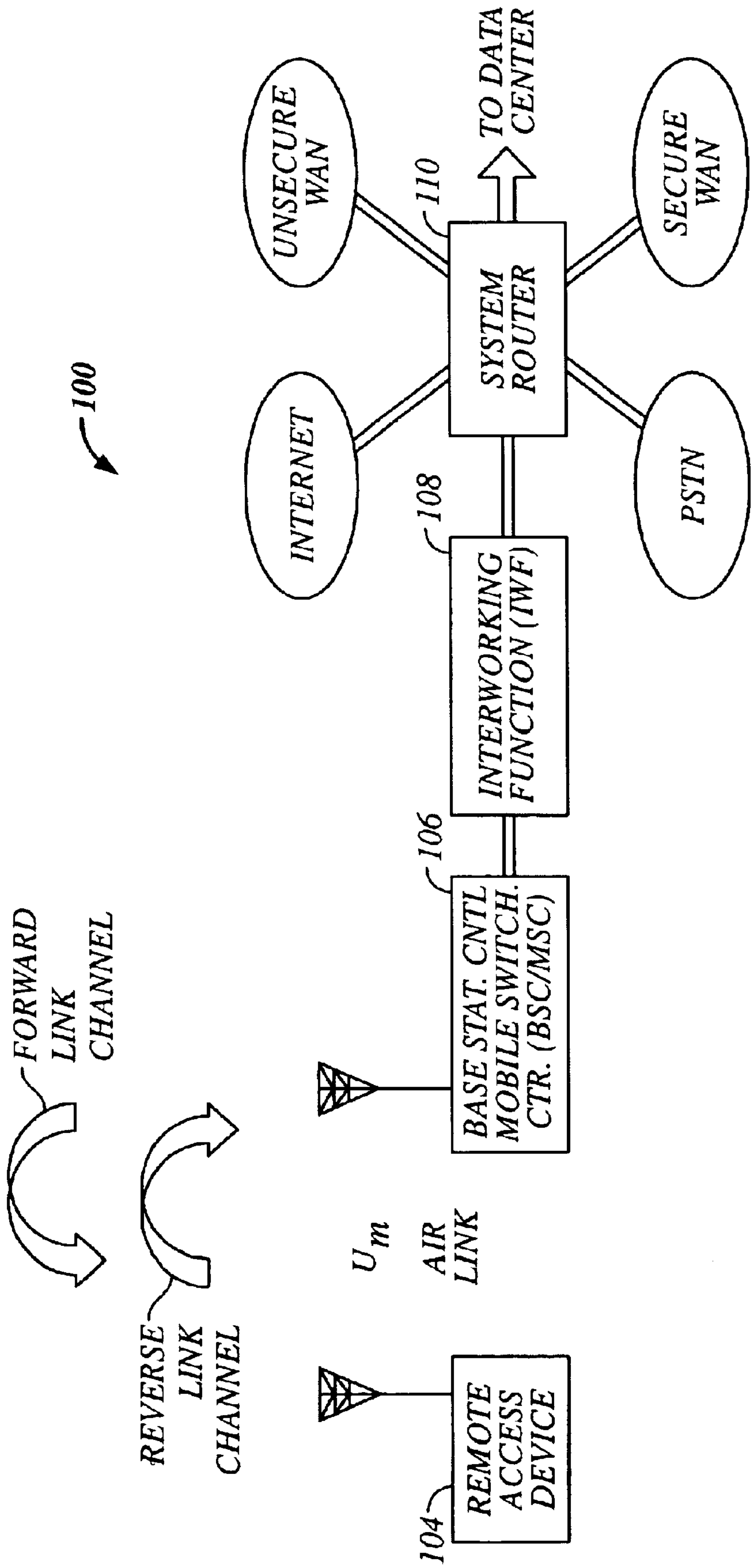
FIG. 1B is a high level block diagram depicting various elements of an exemplary communication system interfacing with a remote data center.

As stated above, the remote access devices 104 have communication capabilities to interface with a variety of communication networks including wireless communication systems. FIG. 1B illustrates the basic elements of a wireless implementation of network 100 in FIG. 1A. Artisans of ordinary skill will readily appreciate that these elements, and their interfaces, may be modified, augmented, or subjected to various standards known in the art, without limiting their scope or function.

In one implementation, the remote access device 104 first communicates and sustains a session with a Base Station Controller/Mobile Switching Center (BSC/MSC) 106 via the wireless interface (i.e., air-link) $U_m$ in accordance with a wireless communication network scheme, such as CDPD, CDMA/IS-95, TDMA/IS-136, MOBITEX, and GSM. The BSC/MSC 106 employs a transceiver to transmit to the remote access device 104 (i.e., forward link) and receive from the remote access device 104 (i.e., reverse link), consistent with the wireless network scheme. The BSC/MSC 106 supervises, manages, and routes the calls between the remote access device 104 and the Inter-Working Function (IWF) 108.

The IWF 108 serves as a gateway between the wireless system 100 and other networks. The IWF 108 is coupled to the BSC/MSC 106 and in many cases it may be co-located with the BSC/MSC 106. The IWF 108 provides the session between the remote access device 104 and the BSC/MSC 106 with an IP address, consistent with the well-known Internet Protocol (IP).

As is well-known in the art, the IP protocol is a network layer protocol that specifies the addressing and routing of packets (datagrams) between host computers and specifies the encapsulation of data into such packets for transmission. Addressing and routing information is affixed in the header of the packet. IP headers contain 32-bit addresses that identify the sending and receiving hosts. These addresses are used by intermediate routers to select a path through the network for the packet towards its ultimate destination at the intended address. Providing the session between the remote access device 104 and the BSC/MSC 106 with an IP address, the session can be intelligently routed to other networks.

The IWF 108 is subsequently coupled to a system router 110, which interfaces with other networks, such as the Public Switched Telephone Network (PSTN) and other Wide Area Networks (WANs) providing Internet- or secure/unsecure Intranet-based access.

3. Data Center Configuration and Host and Enterprise Operations

Data center 190 acts as an intermediary to remotely and securely collect, process, and format the information residing in the enterprise network 403 and to present the information on the remote access device 104 in real time. Generally, the desired information will be stored in a specialized database/messaging server within the enterprise network 403, such as, for example, MICROSOFT® Exchange Server 5.5. Such a database hosts electronic mail, address books, appointment calendars, and is capable of groupware functionality.

Figure 1C:
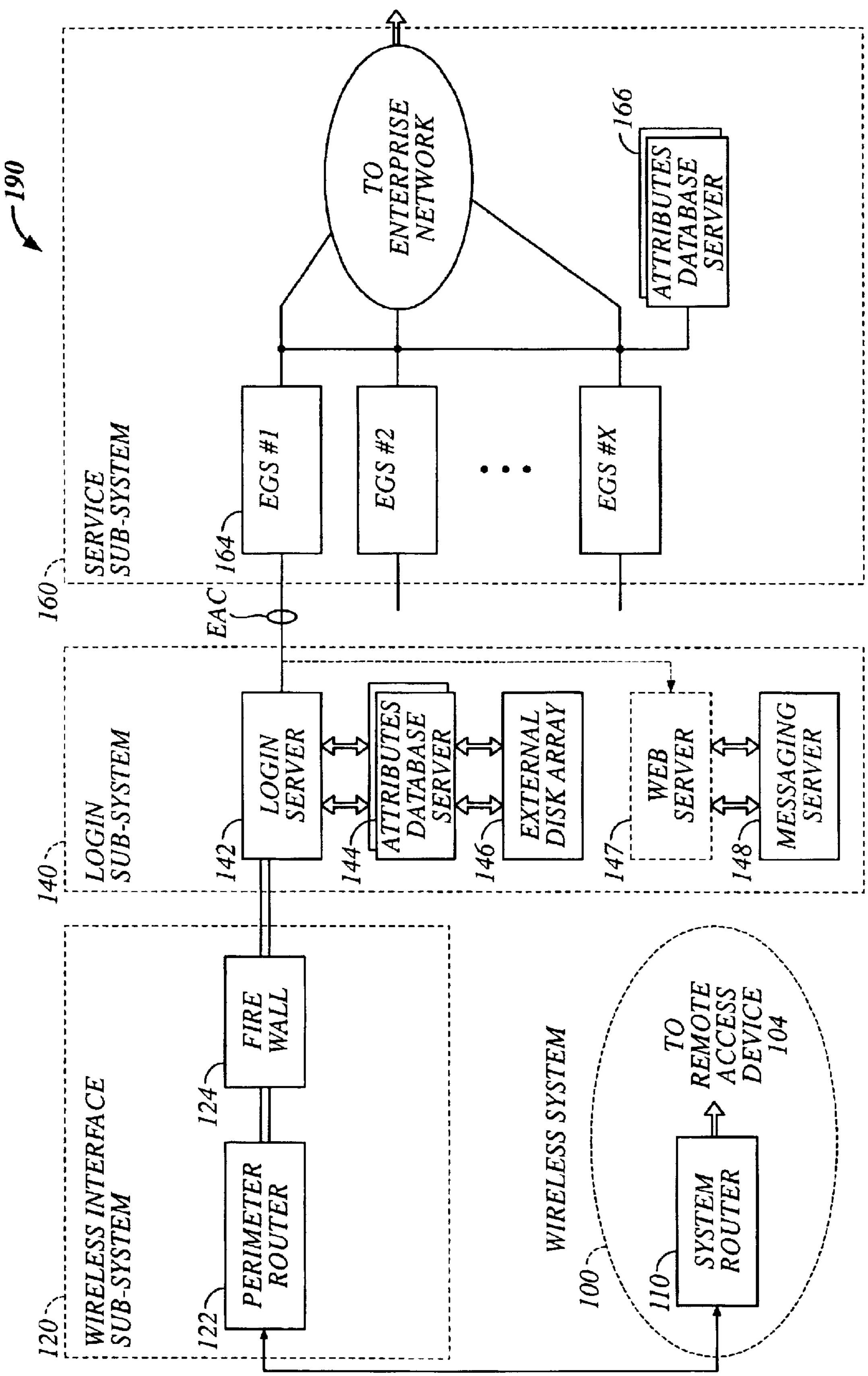
FIG. 1C is a high level block diagram depicting the architecture of a remote data center.

As shown in FIG. 1C, the data center 190 comprises an interface network 120, a Login subsystem 140, and a Service subsystem 160. The interface network 120 employs perimeter router 122 to interface with the wireless communication system 100, which transports the IP datagrams between the remote access device 104 and the BSC/MSC 106. The interface is achieved by virtue of a WAN topology and may employ well-known Asynchronous Transfer Mode (ATM), Frame Relay, dedicated DS-1 (1.544 Mbps), DS-3 (45 Mbps) and other topologies. The perimeter router 122 may connect to the data center 190 through a firewall 124 to provide an added level of protection and further limit access to data center 190 from the Internet. Artisans of ordinary skill will readily appreciate that generally, firewalls are well-known security mechanisms that protect the resources of a private network from users of other networks. For example, enterprises that allow its own subscribers to access the Internet may install a firewall (or firewalls) to prevent outsiders from accessing its own private data resources and for controlling what outside resources its own subscribers have access to. Basically, firewalls filter incoming and outgoing network packets to determine whether to forward them toward their destination.

The firewall 124 interfaces with the login subsystem 140. As depicted in FIG. 1C, the login subsystem 140 comprises a login server (LS) 142, an attributes database server 144. In one implementation an external disk array 146 may be used to store the database information.

The firewall 124 is connected to the LS 142. The LS 142 provides a centralized login site for all subscribers and provides the first level of subscriber authentication. As such, all sessions stemming from subscribers' remote access devices 104 are first handled by the LS 142. The LS 142 is configured as a web server, such as MICROSOFT® Internet Information Server (IIS) for remote corporate enterprise access. The IIS is designed to be tightly integrated with MICROSOFT® Windows NT Server, resulting in faster Web page serving. The LS 142 may be implemented as a single IIS or as a cluster of IISs with load balancing and fault tolerant features provided by MICROSOFT® Windows Load Balancing Service (WLBS).

The LS 142 communicates with an attributes database server 144, which provides, inter alia, subscriber credential profiles to authenticate each subscriber. (The attributes database server 144 may also contain subscriber display preferences and customized enterprise display features). The subscriber credentials are stored in the external disk array 146, which is coupled to the attributes database server 144. The attributes database server 144 may be configured as a Structural Query Language (SQL) database server and may be implemented as a single server or as a cluster of servers with cluster management provided by MICROSOFT® Cluster Server (MSCS).

Figure 2:
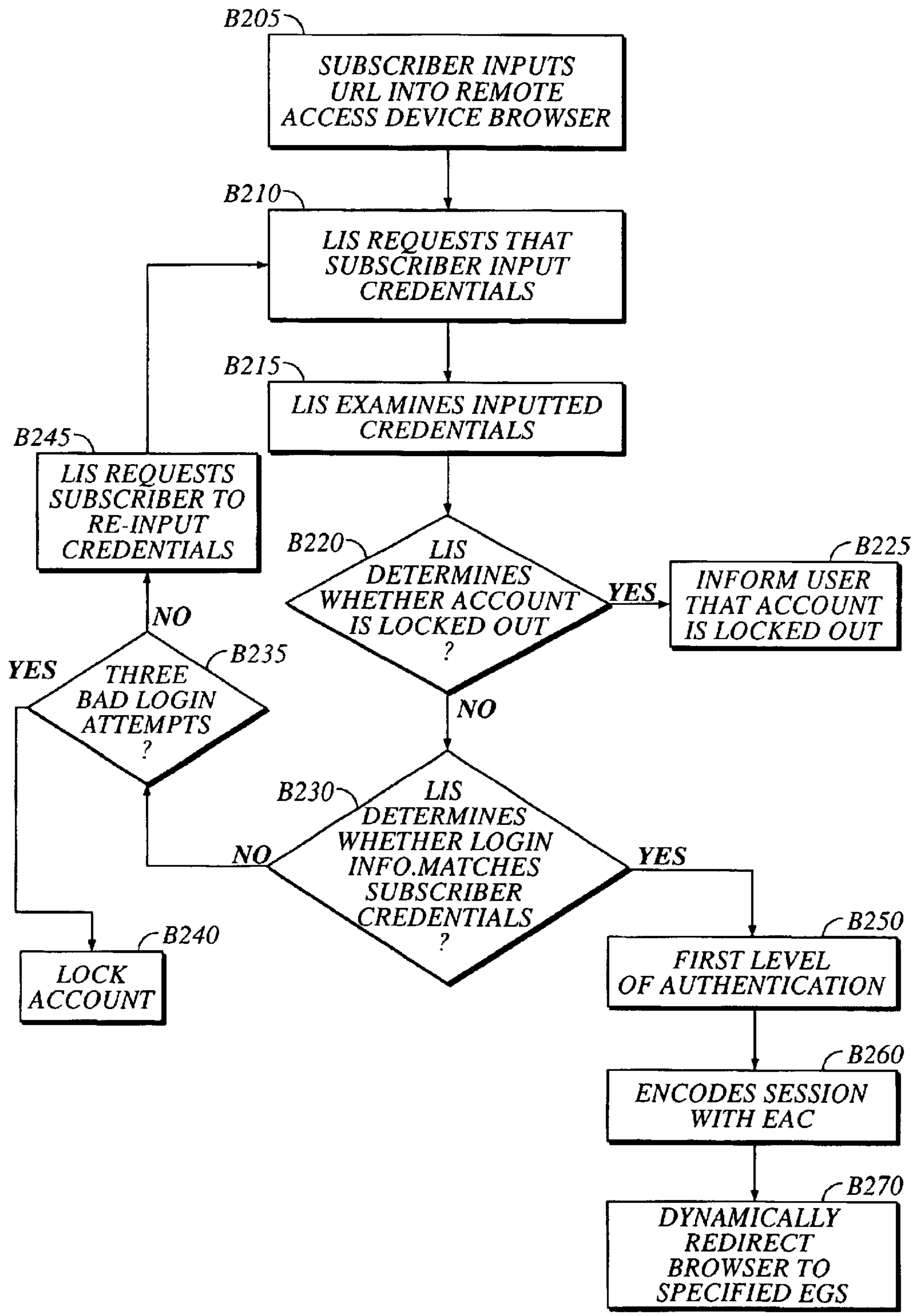
FIG. 2 is a functional block diagram depicting the authentication process.

FIG. 2 illustrates the LS 142 authentication process. As shown in block B205, subscribers input an address or URL, corresponding to a enterprise network or sub-network therein, in the browser interface of their respective remote access devices 104. Generally, inputting a valid URL pointing to a particular enterprise network 403 in the remote access device 104 browser establishes a session between the browser and the LS 142.

The LS 142 responds by sending a message back to the remote access device 104 browser, prompting the subscriber to supply login credentials and a personal identification number (PIN), as indicated in block B210. The login credentials may include subscriber-name and password while the PIN is used as a second level of authentication by the enterprise network 403. In block B215, the LS 142 examines the login credentials. The LS 142 then determines, as shown in block B220, whether the account is locked out. As a security measure, an account is locked out if a predetermined number (e.g., 3) of successive bad login attempts occur. If the account is locked out, the LS 142, in block B225 informs the subscriber that the account has been locked out. LS 142 examines the information. If the account has not been locked out, the LS 142 advances to block B230.

In block B230, the LS 142 compares the examined login credentials with the subscriber credential profile. The subscriber credential profile contains subscriber-specific information, which resides in the attributes database server 144. In block B230, the LS 142 determines whether a match exists between the session-provided information and the stored credential information. If a match does not exist, the LS 142 progresses to block B235, where it first determines whether the current request constitutes the third bad login attempt. If so, the account is locked, as stated above with respect to block B240. If the request does not constitute the third bad attempt, then the LS 142 advances to block B245, where it requests the subscriber to re-input the login information and PIN.

If a match does exist between the session-provided information and the stored credential information, the LS 142 associates the identified subscriber with a corresponding enterprise network 403 (as indicated by the information contained in the URL, subscriber credentials, or a combination thereof), thereby achieving the first level of authentication, as depicted in block B250. It is noted that the existence of a subscriber in the attributes database server 144 is preferably keyed to both the entered subscriber-name and the enterprise network 403 associated with the subscriber. Accordingly, different enterprise networks 403 can have the same subscriber-name.

Upon successfully authenticating the subscriber, the LS 142, in block B260, encodes the session with a subscriber-specific, session-specific, and time/date-specific enterprise access code (EAC). This is achieved by providing the browser on the remote access device 104 with the EAC as well as the address information (i.e., URL) for the dedicated server (i.e., EGS), within the service subsystem 160, that points to the enterprise network 403. The LS 142 then informs the dedicated server of the impending session and provides the server with the EAC. Subsequently, in block B270, the LS 142 dynamically redirects the session to the dedicated server and upon recognizing the EAC session, the dedicated server grants access to the redirected encoded session.

Figure 3:
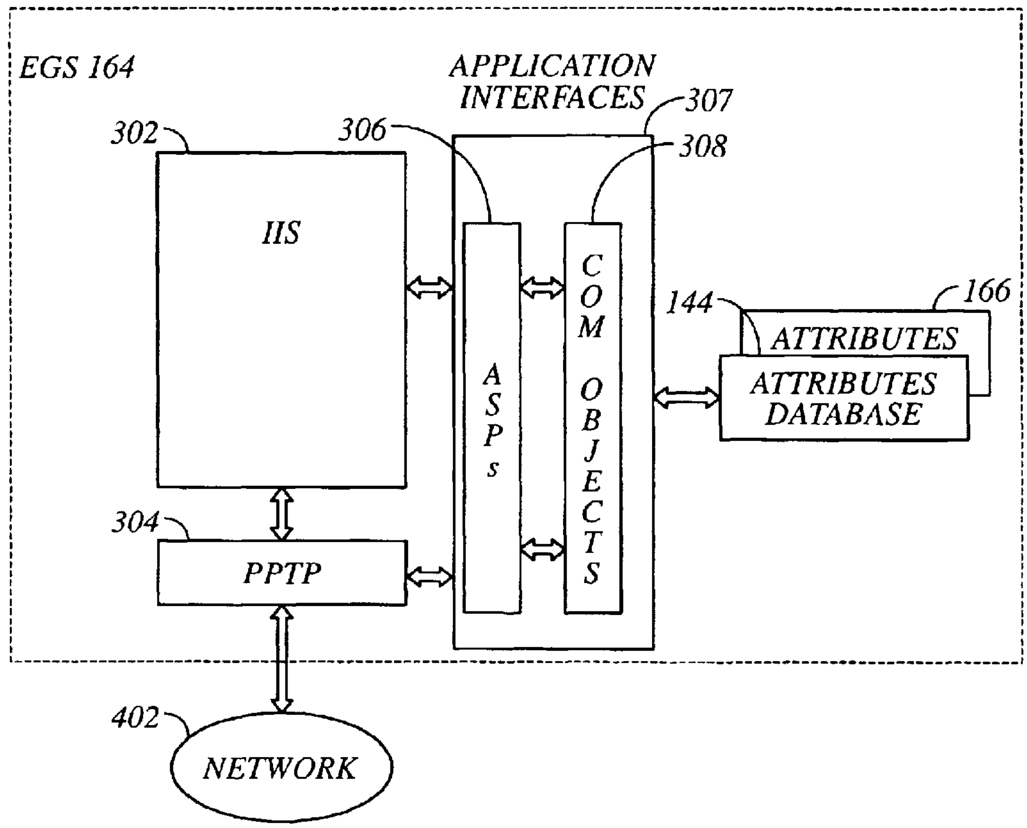
FIG. 3 is a high level block diagram illustrating the basic elements of the EGS.

As depicted in FIG. 1C, the data center 190 includes a service subsystem 160. The service subsystem 160 comprises a plurality of dedicated web servers, wherein each server accesses and services a specific enterprise network and a plurality of attributes database servers 166 which service the dedicated servers. These dedicated web servers are referred to as enterprise gateway servers (EGSs) 164. FIG. 3 illustrates that each EGS 164 comprises a MICROSOFT® Internet Information Server (IIS) 302, a plurality of application interfaces 307, and an associated attributes database server 166. Much like the LS 142, the EGS 164 may be implemented as a single IIS or as a cluster of IISs with load balancing and fault tolerant features provided by MICROSOFT® WLBS.

The application interfaces 307 provide the functionality and interoperability between the EGS 164 elements, the LS 142, and the attributes server 144. The application interfaces 307 comprise a plurality of COM (Component Object Model) objects 308 and Active Server Pages (ASPs) 306 that are specifically designed to achieve EGS 164 functionality. The COM objects 308 (described in more detail below) are reusable program building blocks that can be combined with other components in a distributed network to form functional applications. The ASPs 306 are server-side scripts that are capable of generating markup languages, including but not limited to HTML, HDML, WML, XSL, XML, etc., to perform the dynamic rendering of web content which can be delivered to any browser. The ASPs 306 work with in conjunction with the COM objects 308 to capture the contents of the enterprise network 403 information and dynamically output the information on the browser display of the remote access device 104.

The ASPs 306 are designed to first retrieve the subscriber display preferences from the attributes database server 144 to determine how to render the information on the browser display of the remote access devices 104. These preferences include attributes relating to the formatting, filtering, and sorting of the information. By way of example, suppose a subscriber wishes to retrieve e-mail information from his inbox which is stored in the messaging database server (e.g., MICROSOFT® Exchange Server 5.5) within the enterprise network 403. After inputting the necessary HTTP URL in the remote access device 104 to access the enterprise network 403, a session is established with the LS 142. The HTTP header of the request contains information identifying the particular remote access device 104 used in entering the URL. An ASP 306 exploits this information to determine what type of markup language (e.g., HTML, HDML, WML, XSL, XML, etc.) to use in rendering the display of the desired e-mail information.

As stated above, after establishing subscriber authentication, the LS 142 redirects the session with a URL that points to an ASP associated with a dedicated EGS, along with the type of information sought. In this case, the redirected URL may read as "enterprise_network_A/email.asp", where "enterprise_network_A" is the name of the enterprise network 403 in which the EGS 164 points to and "email.asp" points to the ASP 306 responsible for retrieving and incorporating the subscriber-specified preferences. These preferences identify how the e-mail information in the enterprise network 403 appears on the browser display of the remote access device 104. For example, the subscriber may want the unread inbox entries to be rendered first, followed by the subject of each entry, followed by the initials of the sender, followed by the time and date of transmission, etc. In one implementation, these preferences may be stored in the attributes data server 166 within the service subsystem 160; in another implementation, these preferences may be stored in the attributes data server 144 within the login subsystem 140.

Before retrieving the desired information from the enterprise network, the ASPs 306 are also responsible for validating the session between the EGS 164 and the enterprise network 403. After being re-directed to a dedicated EGS 164, a Virtual Private Network (VPN) connection is established to the enterprise network 403 and the session is extended thereto. As described in more detail below, the ASPs 306 must determine whether the VPN connection and the session between the EGS 164 and the enterprise network 403 are valid.

Finally, the ASPs 306 retrieve the desired information in raw form from the enterprise network 403 and format the raw information in accordance with the subscriber preferences and remote access 104 device limitations.

In addition to acting as an intermediary, the data center 190 may act as a central repository for the subscriber information. In this manner, the data center 190 provides subscribers with "enterprise-like" functionality by hosting subscriber information (e.g., such as e-mail, calendar, and phone book information) that would otherwise be stored in an enterprise network 403. This may be achieved by incorporating a messaging server, such as MICROSOFT® Exchange Server 5.5, within the data center 190.

Much like the "intermediary" case, the subscriber initiates a request in the remote access device 104 and the data center 190 receives the request, establishes a session with the LS 142, and authenticates the subscriber. However, as indicated in FIG. 1C, instead of the LS 142 re-directing the session to an EGS 164 connected to a remotely-situated enterprise network 403, the LS 142 accesses the desired subscriber information from the local messaging server 148 within the data center 190 that hosts such information. One implementation includes re-directing the session to a web server 147 which is coupled to the local messaging server 148, in a manner similar to the EGS 164. By virtue of the application interfaces (similar to the EGS application interfaces 307) designed to the provide functionality between the LS 142, the attributes server 144, and the messaging server 148, the desired information is retrieved and rendered in accordance with the display capabilities of the remote access device 104.

Further, based on the information received from the remote access device 104, including the HTTP header of the request, the login subsystem 140 determines the type of remote access device addressing the data center 190. The login subsystem 140, particularly the login server 142, translates the HTTP header received and provides data and a subscriber interface in accordance with that device type. For example, if the subscriber has indicated her preference for receiving ten e-mail headers when accessing the system with her remote access device 104, and the login server 142 receives the HTTP header and a request for e-mail, the system will only seek to transmit ten e-mail headers for the subscriber.

4. Data Center and Enterprise Network Interaction

As previously discussed, consistent with an aspect of the present invention, the data center 190 retrieves data requested by remote access devices 104 from an enterprise network 403 and returns the requested data, in real time, to the remote devices 104 (i.e., the data center acts as an intermediary). A more detailed description of the interaction of the data center 190 with the enterprise network 403 will now be described with reference to FIGS. 4–7.

Figure 4:
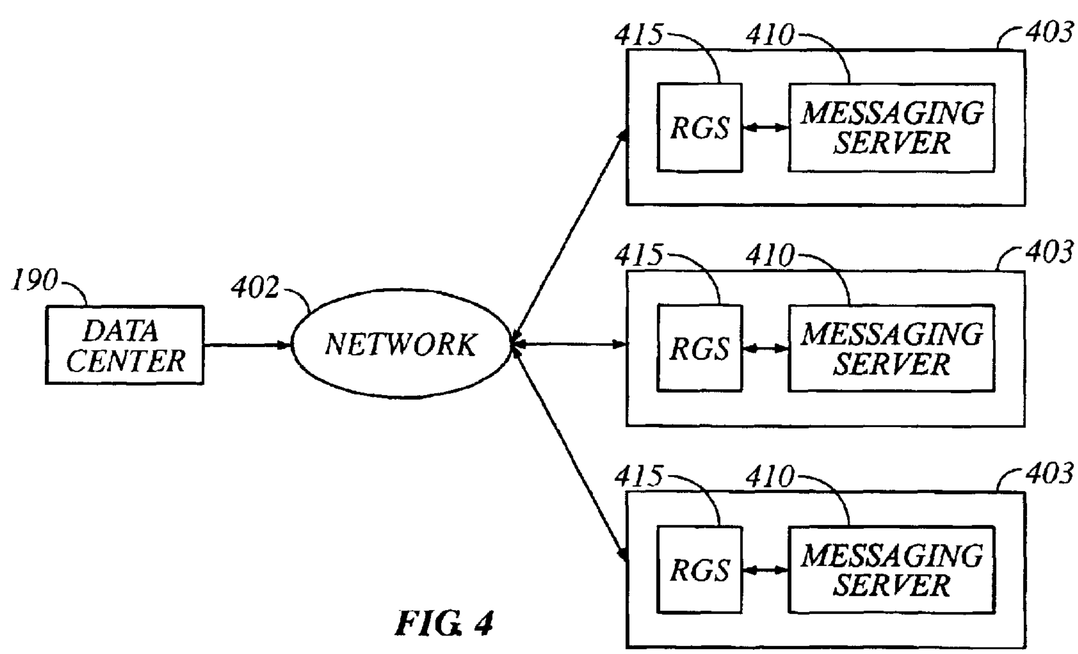
FIG. 4 is high level diagram depicting the connectivity between a data center and a plurality of enterprise network servers.

FIG. 4 is high level diagram of data center 190 coupled, via network 402, to a plurality of enterprise network servers 403. Network 402 may be a network such as the Internet or a proprietary local area or wide area network. Data center 190 links multiple heterogeneous remote devices 104 to one of enterprise network servers 403. At the request of one of remote devices 104, data at an associated enterprise network server 403 is transferred over network 402 to data center 190, where it is converted to a form suitable for display by the requesting remote device.

Each enterprise network server 403 is a computer or network of computers managed by a corporation or other entity that implements corporate messaging and collaboration applications such as email, calendar, or contact information management applications. These applications are implemented by messaging server 410, which may be a dedicated messaging and collaboration server such as a server running MICROSOFT® Exchange Server 5.5 on top of the MICROSOFT® Windows NT operating system. MICROSOFT® Exchange Server and MICROSOFT® Windows are available from MICROSOFT® Corporation, of Redmond, Wash. Other known implementations of the messaging and collaboration servers may equivalently be used.

Remote Gateway Servers (RGS) 415 are preferably implemented as servers that act as an intermediary between messaging servers 410 and data center 190. Although the messaging servers 410 could communicate directly with data center 190, remote gateway servers 415 provide a layer of abstraction between the messaging servers and the data center 190 that enables more efficient communication when communicating over a "slow" network such as the Internet. RGSs 415 are described in more detail below. RGSs 415 may optionally not be used, in which case the messaging servers 410 communicate could communicate directly with data center 190. For the reasons discussed below with reference to FIGS. 7A and 7B, this has been found to be a less efficient implementation.

If network 402 is a public network, such as the Internet, data transmitted over network 402 is at risk of being intercepted or monitored by third parties. To avoid this problem, the data may be encrypted at its transmission site (e.g., data center 190 or enterprise network server 403), and correspondingly decrypted at its reception site. By encrypting all data transmitted over network 402, data center 190 and enterprise server 403 effectively communicate with one another as if they were on a private network. This type of encrypted network communication is called a virtual private network ("VPN").

Figure 5A:
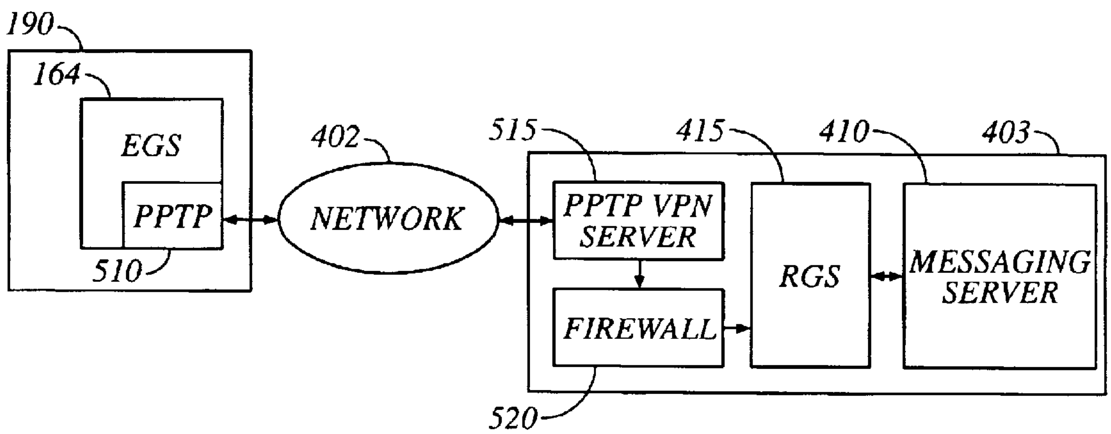
FIGS. 5A, 5B are block diagrams illustrating embodiments of the implementation of a Virtual Private Network interconnecting a data center and an enterprise network.
Figure 5B:
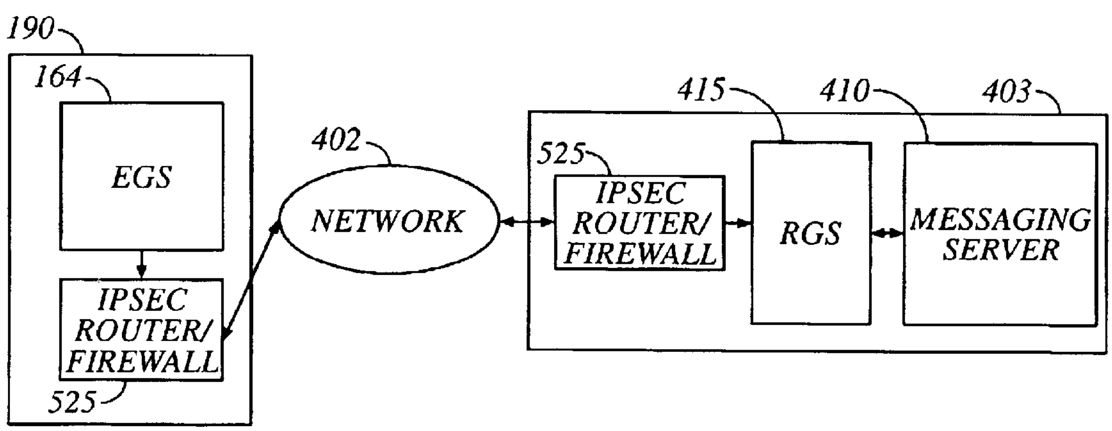

FIGS. 5A and 5B are block diagrams illustrating embodiments of the implementation of a VPN between data center 190 and enterprise network 403. The VPN is implemented by encrypting information transmitted between EGS 164 and its corresponding RGS 415 on enterprise network server 403.

As shown in the embodiment of FIG. 5A, EGS 164 encrypts the transmitted data using software 510 running on the EGS. The encrypted data is transmitted over network 402 and decrypted by dedicated VPN server 515. Data flowing from enterprise network server 403 to data center 190 is similarly encrypted at VPN server 515 and decrypted by software 510. Firewall 520 may optionally be implemented in conjunction with VPN server 515 to limit unauthorized outsiders from accessing the private data resources of enterprise network 403 and to control what outside resources users at enterprise 403 have access to. Firewalls are well known in the art.

One example of appropriate encryption/decryption software 510 is software that implements the well known Point-to-Point Tunneling Protocol (PPTP). Although PPTP software 510 is shown executing on a VPN server 515 and EGS 164, it may alternatively be implemented in special purpose PPTP routers or other network devices.

FIG. 5B illustrates another embodiment implementing a VPN between data center 190 and enterprise network 403.

This embodiment is similar to the one described with reference to FIG. 5A, the primary difference being that the IPSEC (Internet Protocol Security) standard is used to encrypt/decrypt data instead of the PPTP standard. As shown, encryption using IPSEC is implemented by a pair of complementary routers 525.

The IPSEC standard is known in the art. In contrast to the PPTP standard, the IPSEC standard can provide encryption at the session layer or the network packet processing layer. PPTP provides encryption at the session layer. Additionally, the IPSEC standard offers considerably more options in the implementation of bulk encryption or hash algorithms.

RGS 415 communicates with data center 190 through the VPN. Although RGS 415 may be typically present at the same location as the corporate network, RGS 415 and data center 190 are preferably given limited access to messaging server 410 as well as any other corporate servers. In particular, RGS 415 is only given the authority to communicate with messaging server 410 to the extent necessary to retrieve and store data related to the messaging and collaboration applications implemented by messaging server 410. Thus, even though RGS 415 may be given limited access to messaging server 410 and the rest of enterprise network 403, it is generally physically located at the site of the enterprise network 403.

Figure 6:
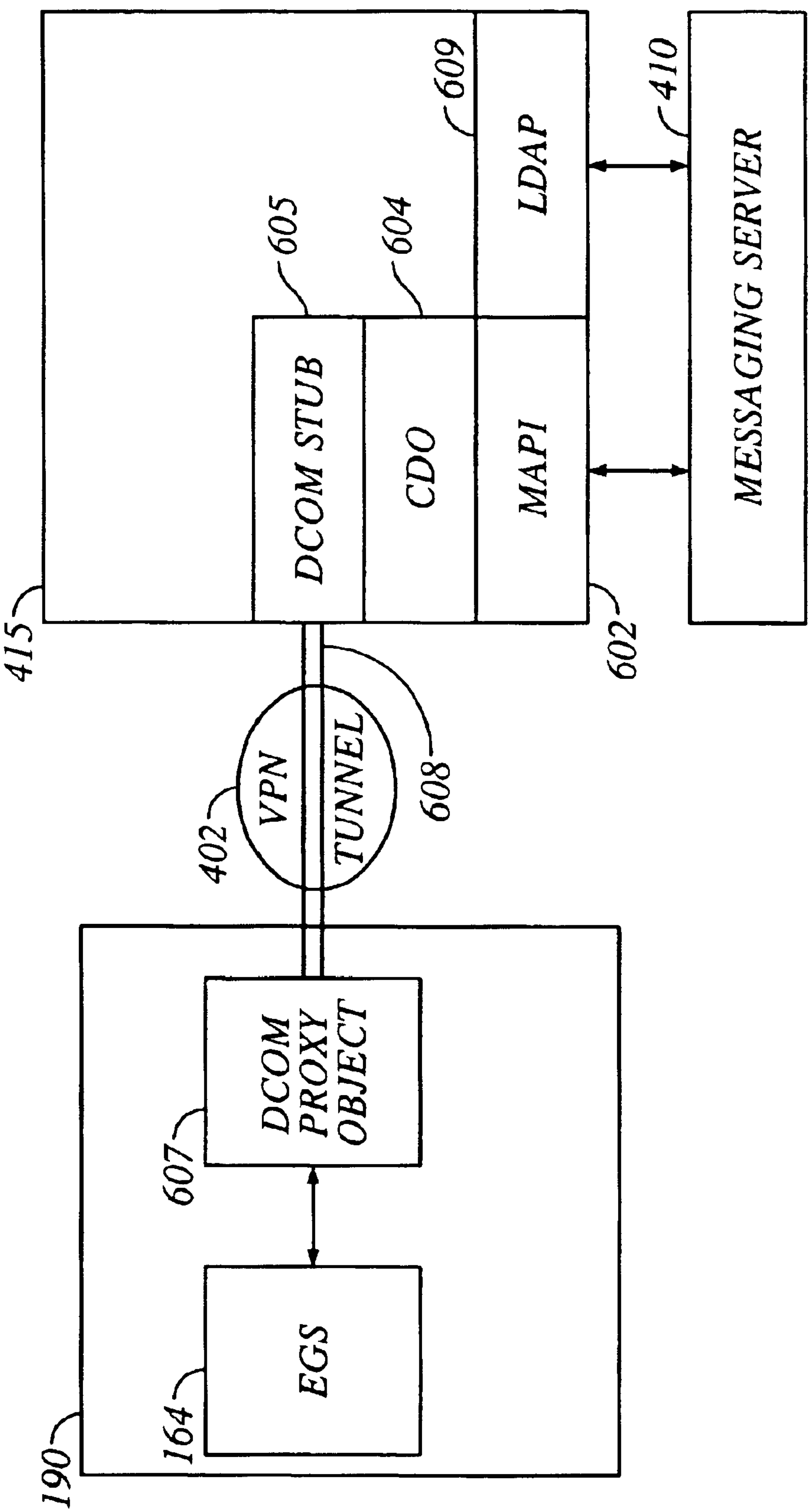
FIG. 6 is a diagram depicting the architecture of the RGS software components.

FIG. 6 is a diagram of a more detailed architectural view of the software components used to implement RGS 415.

As shown, RGS 415 provides a MAPI (Messaging Application Program Interface) interface 602. MAPI 602 is a MICROSOFT® Windows program interface that enables software objects on RGS 415 to communicate with a MAPI-compliant information store, such as MICROSOFT® Exchange messaging server 410. MAPI 602 provides the low level interface between RGS 415 and messaging server 410. MAPI 602 accesses messaging server 410 based on commands from CDO (Collaboration Data Object) object 604. CDO 604 is an object in the COM (Component Object Model) framework for the development of component software objects. COM provides the underlying services of interface negotiation, life cycle management (determining when an object can be removed from a system), licensing, and event services (putting one object into service as the result of an event that has happened to another object). MAPI, the COM framework, and the CDO object are all available from MICROSOFT® Corporation.

CDO 604, in operation, processes requests from data center 190 to access messaging server 410. Typical CDO requests include requests such as: retrieve the message object for a particular email of a particular subscriber, retrieve the subject of the email, and retrieve the time the email was sent. For each of these requests, CDO 604 accesses messaging server 410, retrieves the requested information, and returns the information to the requesting entity.

Objects in the conventional COM framework, such as CDO 604, are limited to communicating with other objects on the same server. COM may be extended to access and use resources present at server program objects on other computers in a network using the DCOM (Distributed Component Object Model) framework. DCOM is available from MICROSOFT® Corporation.

Figure 7A:
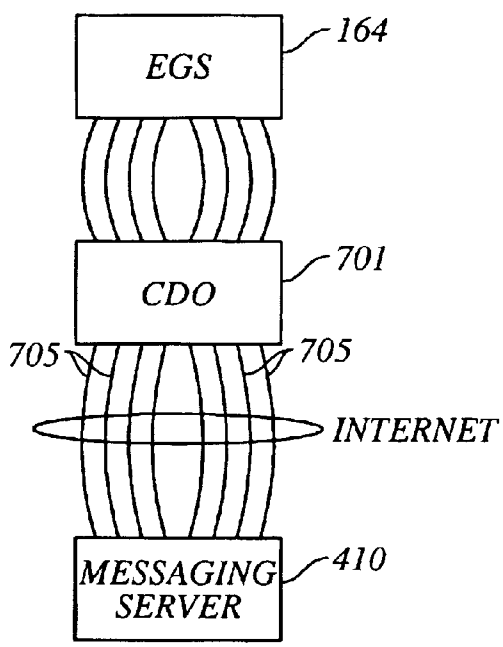
FIGS. 7A and 7B are diagrams depicting alternative embodiments of the communications between a messaging server and an EGS.

CDO 604, operating under DCOM, may be stretched across network 402 so that requests for messaging server 410 are initiated by a CDO object resident in EGS 164. This implementation is conceptually illustrated in FIG. 7A, in which CDO 701 is shown communicating directly with messaging server 410 across the Internet. However, because CDO 701 generates multiple individual requests 705 for what can often be represented by a single request (e.g., CDO 701 generates separate network requests to retrieve the subject and the time that an email is sent, while practically, these requests may both be submitted at the same time), delays can occur when accessing messaging server 410. In particular, when, as shown in FIG. 7A, CDO 701 is located across a relatively slow or unreliable network such as the Internet, generating multiple requests at CDO 701 can cause significant delays in the overall response time. For example, if there is a quarter second delay associated with transmitting a request over the Internet, one request for a message from message server 410 may be acceptable, while 40 partial requests for the same message may result in an unacceptably long delay to retrieve the message.

Consistent with an aspect of the present invention, a DCOM stub object 605, executing locally on RGS server 415, and a DCOM proxy object 607, executing on EGS server 164, introduce a layer of abstraction between CDO object 604 and EGS server 164. More particularly, DCOM stub 605 and DCOM proxy object 607 communicate with one another over network 402 using a higher level, less messaging intense protocol than that used by CDO 604 when communicating with messaging server 410. Instead of issuing multiple requests over network 402 to retrieve a particular e-mail's header, time stamp, priority, and body, DCOM proxy 607 may issue a single aggregate request for all the information associated with one email, or for the first ten emails. DCOM stub 605 receives the single request from DCOM proxy 607 and converts it into the appropriate CDO calls. Data received back from CDO 604 is similarly aggregated into the higher level protocol and transmitted back across network 402 to DCOM proxy 607. Because CDO 604 executes locally with messaging server 410, multiple calls to the messaging server do not significantly slow system response time.

In addition to handling CDO call aggregation, DCOM proxy 607 and DCOM stub 605 manage the connection over network 402. Once EGS 164 instantiates DCOM proxy 607, DCOM proxy 607 establishes a dedicated VPN session connection ("tunnel") 608 between DCOM proxy 607 and DCOM stub 605. After establishing a VPN connection, DCOM stub 605 receives the subscriber's PIN from DCOM proxy 607. The PIN is passed to Lightweight Directory Access Protocol (LDAP) object 609, which retrieves a locally stored copy of the subscriber's PIN and compares it to the copy received from enterprise gateway server 164. By comparing PINs at the enterprise, a second level of subscriber authentication is achieved. The values of the PINs are controlled locally at enterprise server 415. Accordingly, system administrators at the enterprise server have control of the second authentication level, and therefore final control over which subscribers are allowed to access the enterprise network information.

From the point of view of EGS 164, CDO object 604 is executing locally at data center 190. EGS 164 accesses DCOM proxy 607 as if it were a locally executing CDO object. Proxy 607 converts the CDO requests from EGS 164 to the previously mentioned higher level, less message intensive protocol, and transmits the request through the session tunnel 608 to DCOM stub 605. Thus, calls across network 402 are handled transparently to EGS 164. Additionally, dropped or lost tunnels to DCOM stub 605 are reinitiated by DCOM proxy 607 and DCOM stub 605 without involving EGS 164.

Figure 7B:
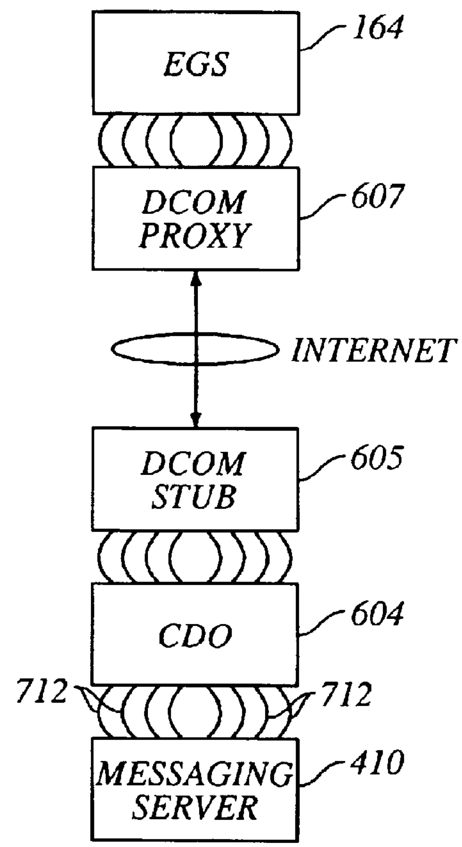

FIG. 7B is a conceptual diagram illustrating the communication path between messaging server 410 and EGS 164 when DCOM proxy 607 and DCOM stub 605 are used. As shown, CDO 604 communicates with messaging server 410 using multiple CDO requests 712. DCOM stub 605 aggregates the results of a number of CDO requests and transmits it to DCOM proxy 607 over an encrypted session tunnel. Proxy 607 converts the aggregated results into CDO messages for EGS 164.

5. Additional Attributes

The system further includes the ability to personalize or customize the subscriber interface based on the status or desire of the subscriber or the enterprise network 403. For example, the party maintaining the enterprise network 403 may wish to introduce certain graphics or data when a subscriber logs in or seeks data from the enterprise. Coupled with this is the desire of a subscriber to configure his or her account to show certain information; for example, when the subscriber is operating a device at his workplace, he may wish to only receive work related e-mail. Alternately, the subscriber may have language preferences or screen style preferences that he or she wishes to view on particular devices.

The subscriber enters his preferences which are stored in the SQL server in the login subsystem 140. These features may include background color, primary and secondary colors, or other preferences for the subscriber interface. When the subscriber accesses the service, the login server 142 receives the carrier, enterprise, language, and browser information from the signal received.

The set of customizable elements are identified by a sequence called the customization ID. The customization ID represents a unique combination of carrier, enterprise and language desired by the particular enterprise. When a user logs into the system, their customized look and feel is determined by matching their carrier, enterprise and language preferences to the master set of customization IDs. The system then fetches the matching custom elements. The customized elements are inserted into ASPs at specific locations, thereby altering the look and feel of the system.

In many cases, enterprises do not customize every possible element of the service but simply change a small subset such as the banner logo and primary colors. In these cases where many elements are not customized, default values are retrieved so that the entire look and feel is preserved when the page is being internally "assembled."

The custom elements themselves are not fetched directly from the SQL Server during runtime but are stored as a structured array of values in memory on the server. Running in memory provides increased performance by minimizing database queries for custom elements. The customization system "refreshes" itself during runtime by updating the in-memory structure arrays from the data in the SQL Server database. Changes to the customization system are therefore available real-time without the need to restart the system.

The system maintains a Customization table, which includes a correlation between a specific combination of Carrier, Enterprise and Language and a unique Customization ID, i.e., [Provider X; Company Y; French Canadian] is CustomizationID #6. This combination of factors, or Customization ID, is in turn related to a set of customized elements. The number and variety of customizable elements can be extensive depending on resource availability, and can range from the background color of the page to the text within the subject header of the e-mail in box. The CustomElementNames table maintains the master list of all of the customizable elements supported.

TABLE 1

CUSTOMELEMENTSNAMES TABLE

| ELEMENTNAME | SortOrder | Note | Example |
|---|---|---|---|
| CarrierBannerLog | 1 | HTML | <img src="images/default/att_logo.gif"> |
| MainBgColor | 1 | Hex Color | #FFFFFF |
| PpcBannerLogo | 5 | Text | Revolv Home |
| HdmlPhoneAboutText | 4 | HDML | <LINE>Wireless Knowledge<LINE>LLC |

The system stores the customized elements are in the CustomElements table which maintains a correlation between a specific Customization ID and all of the customizable element names and their associated values. By having the CustomElements table track elements as name/value pairs, elements may be removed or added without modifying the table structure. Element values can be HTML, HDML, XML, hex values plain text or any other textual information.

TABLE 2

CUSTOMELEMENTS TABLE

| CUSTOMIZATIONID | ElementName | ElementValue |
|---|---|---|
| 1 | CarrierBannerLogo | <img src="images/default/WKBanner.jpg" width="270" height="70" border="0"> |
| 1 | PhoneHomeTitle | Revolv Home |
| 5 | CarrierBannerLogo | <img src="images/bm/Service ProviderXBanner.jpg" width="300"height="70" border="0"> |
| 6 | PhoneHomeTitle | Service ProviderXl |

When a user logs in, the system obtains the user's CarrierID, EnterpriseID and LanguageID from her record in the Users table. The system then compares these three values against the Customization table, looking for a match. If an exact match is not found, the system searches for the closest match in the following order of precedence:

a. Look for a matching CarrierID, EnterpriseID, and LanguageID b. Look for a matching CarrierID, EnterpriseID and default language c. Look for a matching CarrierID, no enterprise and LanguageID d. Look for a matching CarrierID, no enterprise and default language e. Use the default look and feel Based on the closest match, the system determines the CustomizationID. As may be appreciated, the enterprise dictates certain components of the Customization ID. Should no enterprise dictated parameters be available, the system may provide the user with the ability to dictate preferences for appearance, and if the user has not indicated the information, the default appearance is presented to the user.

Figure 8:
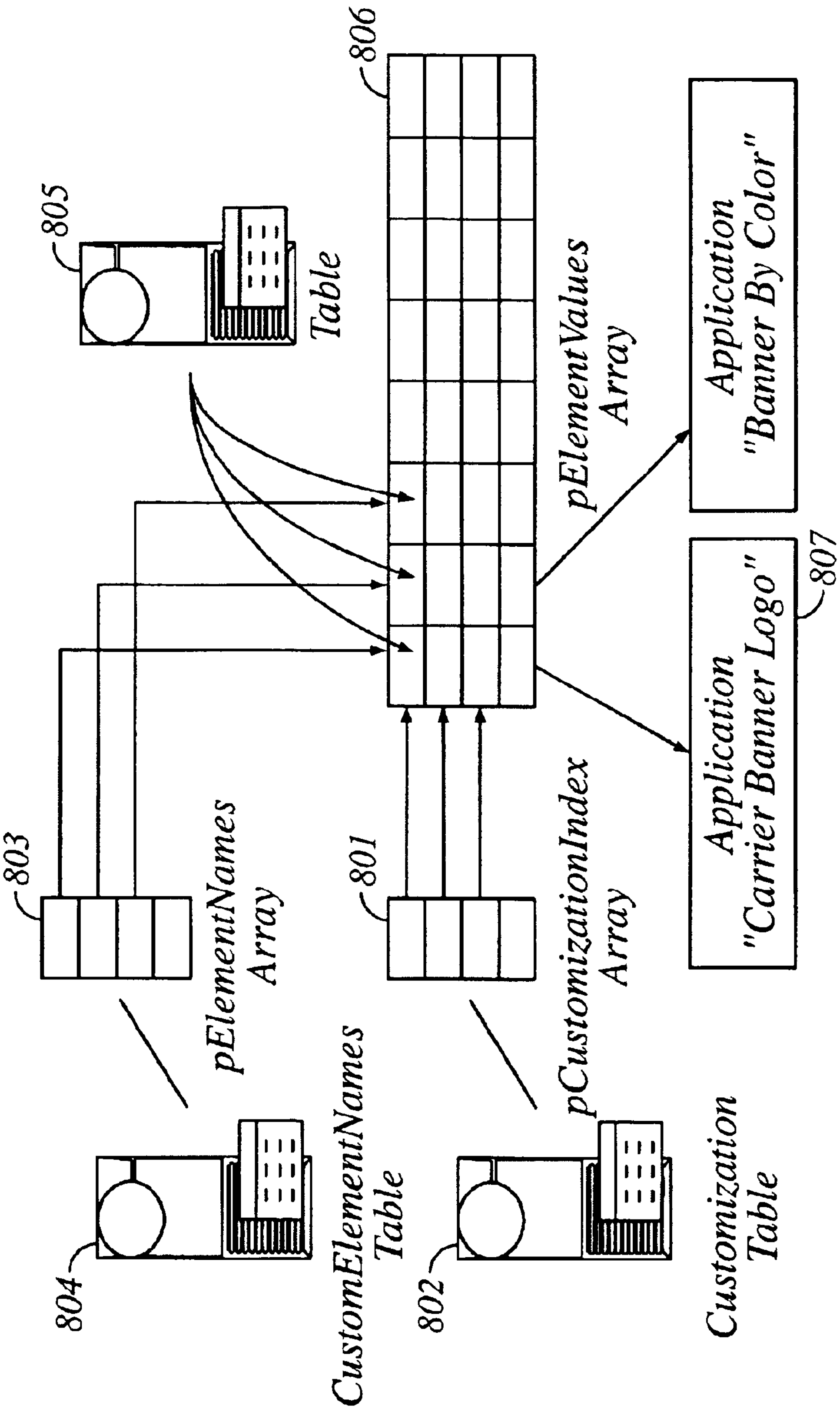
FIG. 8 illustrates the customization initialization procedure.

Application startup procedures are presented in FIG. 8. On application startup, the system builds the pCustomizationIndex array 801 by parsing the Customization table 802 and ordering the CustomizationID's sequentially. This array will later be used as an "row index" for the pElementValues array 806. The system then builds the pElementNames array 803 by parsing the CustomElementNames table 804. The pElementNames array 803 serves as the "column index" for the pElementValues array 806. The system then populates the pElementValues array 806 by parsing the CustomElements table 805. Each row of the pElementValues array 806 corresponds to a specific element found in the pElementNames array 803, and each column of the pElementValues array 806 corresponds to a specific CustomizationID from the pCustomizationIndex array 801. The CustomElements table 805 is parsed and the values are positioned within the pElementValues array 806 according to the ElementName and CustomizationID for each record.

Once the system has populated the pElementValues array 806, the array is parsed and each row is stored in a variant array 807. Each variant array is then stored in an Application variable with the same name as the array element, i.e., Application("CarrierBannerLogo").

Each application includes the customization library in its global variable definitions. This file contains all of the functions needed by customization. The Application_OnStart subroutine calls the initCustomization( ) function, which performs the first-run parsing of the database tables and the storage of the customized elements into Application variables. This function loads the latest customized elements from the database and populates Application variables with variant arrays containing these elements.

The system determines the user's CustomizationID by examining her CarrierID, EnterpriseID and LanguageID and finding the CustomizationID that is the closest match. Once the CustomizationID has been determined, the system compares it to the CustomizationIndex array to determine which array positions contain the customized elements for this user. This derived value is called the User Customization Index value and is stored in a Session variable (or carried along the query string for Phone code). The getUserCustomizationIndex( ) function returns a value representing the ordinal position of customized elements for the particular user. Since all of the customizable elements of the service are stored as variant arrays within Application variables for each application they are easily accessible from ASP. Each page that needs customization must have the getElement( ) function included, which returns a string value representing the customization element for a specific Customization ID. For efficient operation, each occurrence of a hard-coded element (HTML or otherwise) must be replaced with the getElement( ) function. Each web application needs to have an ASP page that calls the initCustomization( ) function, passing an argument to display the customized contents as they are populated into Application variables.

The system further provides for notification in circumstances where the user requests to be notified on a particular input device under predetermined conditions. When the subscriber receives a communication that he or she has established to be important, such as an e-mail message having a designation of urgent, the system attempts to notify the subscriber. The subscriber states his or her preferences for notification, such as what events trigger a notification and which input device or devices should be notified of the triggering event. These notification indications are maintained in the SQL server at the data center 190, and this information is periodically monitored. As may be appreciated, only certain events will require user notification. With data information limited to e-mail, calendar, and contacts, notification will not be required for contacts, and certain e-mail requests may require notification. Calendar items may also prompt notification. In such circumstances, the user preference may require monitoring at the remote enterprise by passing the requested notifications to the remote enterprise location. Alternately, notification may monitor user requests at the data center 190, with requests periodically transmitted to the enterprise servers. The problem with maintaining the information at the data center 190 and transmitting requests to the enterprise server is overhead. In the scenario where the data is provided to the enterprise server, the enterprise server maintains the preferences for all users in its domain, such as notification of an urgent e-mail, and when the condition is true, passes information to the data center 190. Data center 190 correlates the notification with the various input devices requested to be notified by the user, and transmits the data to the user input device requested.

A further aspect of the current system is the ability for the system to determine the type of device accessing the system. For example, the system receives information over a data line including initialization information, account information, passwords, and so forth, in addition to browser information. Browser information includes the information requested for the type of browser used, e.g. a MICROSOFT® Windows CE device indicates that it is using a Windows CE compliant browser. Included in the browser information is header information from which the data center 190 can determine the type of device transmitting the data. The data center 190 stores the information expected to be received from a particular browser; for example, the Netscape browser, used on desktop and laptop devices, may include the word "mozilla" in its header information. The data center 190 maintains predetermined expected header parameters for each anticipated input device. This predetermined information is maintained in the SQL server. Upon connection between the input device and the data center 190, the data center retrieves the browser header information and compares this information with the predetermined information and, if it determines a match, interfaces with the input device with input device specific data, e.g. screen size limitations, colors/greyscale data, and so forth. Thus the system does not require user input to determine the type of device addressing the data center 190 and can transmit appropriate input device specific data to the user.

Further, as may be appreciated from the foregoing description, the data center interacts with the enterprise network by transmitting requests to the enterprise network and receiving responses therefrom. As may be appreciated, a user desiring access to the data center will in most circumstances also wish to have access to the enterprise network. For security reasons, an enterprise network may not wish the data center to directly access the enterprise, and will not automatically grant access. Most enterprise networks will have firewalls installed to prohibit access by unknown parties.

The system accepts passwords for access to the data center and the user logs into the data center. Subsequent to this logon, the system knows the enterprise where the user may access information based on the user's profile. The user then is provided by the data center to the enterprise network, where the user must log into the enterprise. This will typically be a different user name and a different password. Certain password evaluation algorithms are employed by the data center to guard against access by unauthorized parties. However, under all conditions, the data center never obtains the user's enterprise password, but merely passes the user's password through to the enterprise without storing or evaluating the information.

The foregoing description of preferred embodiments of the present invention provides illustration and description, but is not intended to be exhaustive or to limit the invention to the precise form disclosed. Modifications and variations are possible consistent with the above teachings or may be acquired from practice of the invention. Accordingly, the scope of the invention is defined by the claims and their equivalents.

What is claimed is:

1. A method comprising:

converting a plurality of data requests for messaging and collaboration data into a single higher level request in an enterprise gateway server;

transmiting the higher level request over a data network;

receiving the higher level request in a remote gateway server;

converting the higher level request to the plurality of data requests; and providing messaging and collaboration data from the remote gateway server to the enterprise gateway server in response to receiving the plurality of data requests.

2. The method of claim 1, wherein the data network is a public network.

3. The method of claim 2, wherein the data transmitted over the public network is encrypted so as to form a virtual private network (VPN).

4. The method of claim 3, wherein the VPN is formed with a Point-to-Point Tunneling Protocol (PPTP) connection.

5. The method of claim 3, wherein the VPN is formed using the Internet Protocol Security (IPSEC) standard.

6. The method of claim 1, wherein the messaging and collaboration data is one of email, calendar, or contact information.

7. The method of claim 1, wherein the data network is a private network.

8. The method of claim 1, wherein the single higher level request is produced by a Distributed Component Object Model (DCOM) proxy program.

9. The method of claim 1, wherein a Distributed Component Object Model (DCOM) stub program receives the higher level request and converts the higher level request to the plurality of data requests.

10. A computer-readable medium embodying a method, the method comprising:

converting a plurality of data requests for messaging and collaboration data into a single higher level request in an enterprise gateway server;

transmiting the higher level request over a data network;

receiving the higher level request in a remote gateway server;

converting the higher level request to the plurality of data requests; and providing messaging and collaboration data from the remote gateway server to the enterprise gateway server in response to receiving the plurality of data requests.

11. The computer-readable medium of claim 10, wherein the data network is a public network.

12. The computer-readable medium of claim 11, wherein the data transmitted over the public network is encrypted so as to form a virtual private network (VPN).

13. The computer-readable medium of claim 12, wherein the VPN is formed with a Point-to-Point Tunneling Protocol (PPTP) connection.

14. The computer-readable medium of claim 12, wherein the VPN is formed using the Internet Protocol Security (IPSEC) standard.

15. The computer-readable medium of claim 10, wherein the messaging and collaboration data is one of email, calendar, or contact information.

16. The computer-readable medium of claim 10, wherein the data network is a private network.

17. The computer-readable medium of claim 10, wherein the single higher level request is produced by a Distributed Component Object Model (DCOM) proxy program.

18. The computer-readable medium of claim 10, wherein a Distributed Component Object Model (DCOM) stub program receives the higher level request and converts the higher level request to the plurality of data requests.

* * * * *